Dec. 6, 1938.　　　　F. R. HOUSE　　　　2,139,635
UNIVERSAL ANTIAIRCRAFT SIGHT
Original Filed June 30, 1936　　5 Sheets-Sheet 1
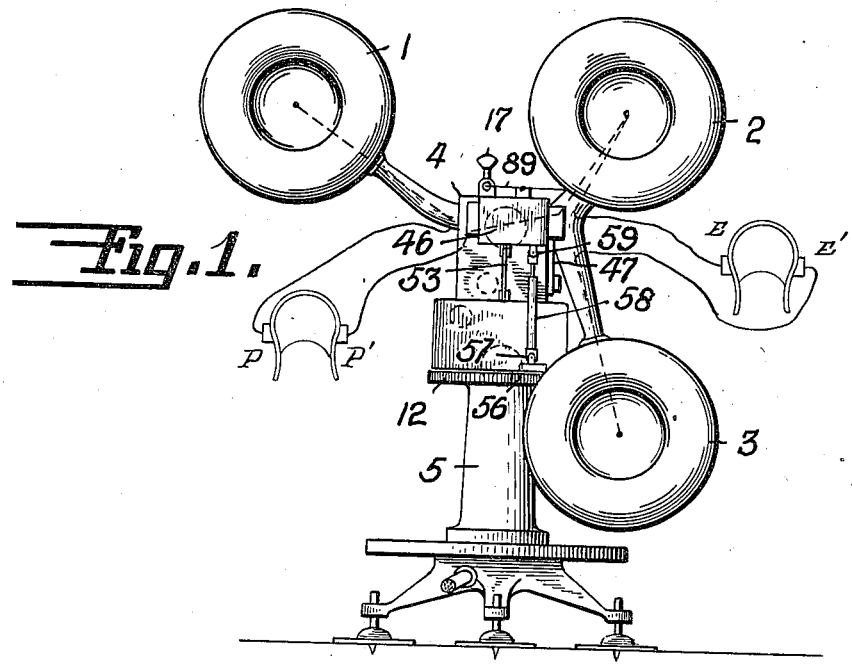
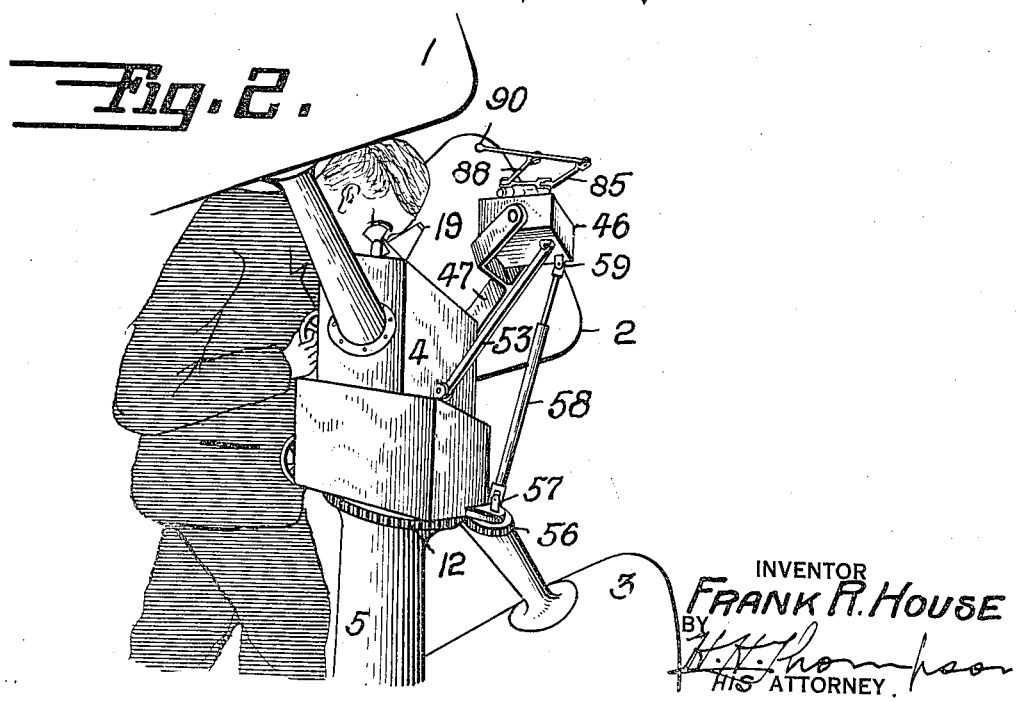
INVENTOR
FRANK R. HOUSE
BY
HIS ATTORNEY.

Dec. 6, 1938.  F. R. HOUSE  2,139,635
UNIVERSAL ANTIAIRCRAFT SIGHT
Original Filed June 30, 1936   5 Sheets—Sheet 2
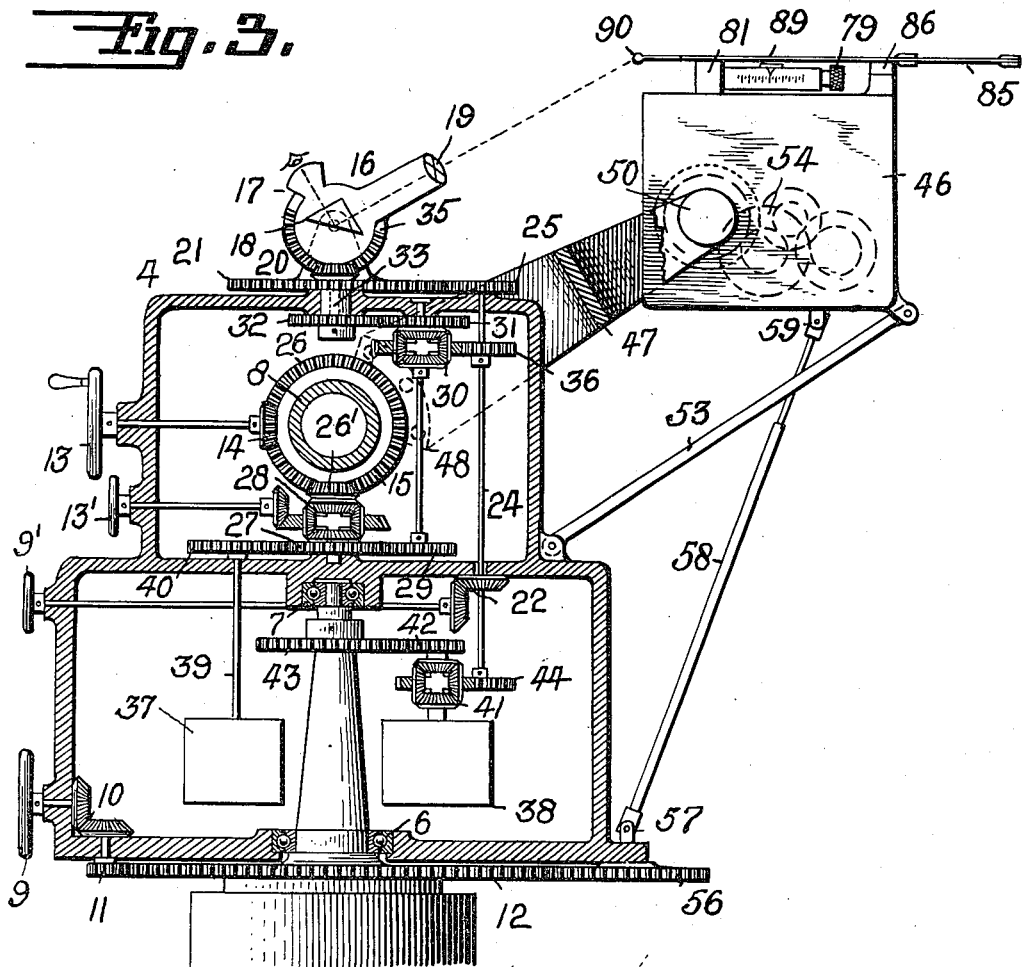
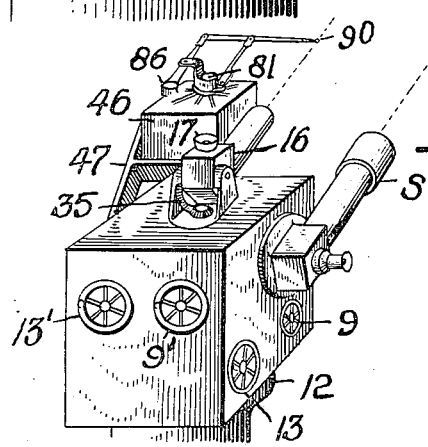
INVENTOR
FRANK R. HOUSE
BY
HIS ATTORNEY.

Dec. 6, 1938.   F. R. HOUSE   2,139,635
UNIVERSAL ANTIAIRCRAFT SIGHT
Original Filed June 30, 1936   5 Sheets-Sheet 3

INVENTOR
FRANK R. HOUSE
BY
Herbert H. Thompson
HIS ATTORNEY.

Dec. 6, 1938.   F. R. HOUSE   2,139,635
UNIVERSAL ANTIAIRCRAFT SIGHT
Original Filed June 30, 1936   5 Sheets-Sheet 4
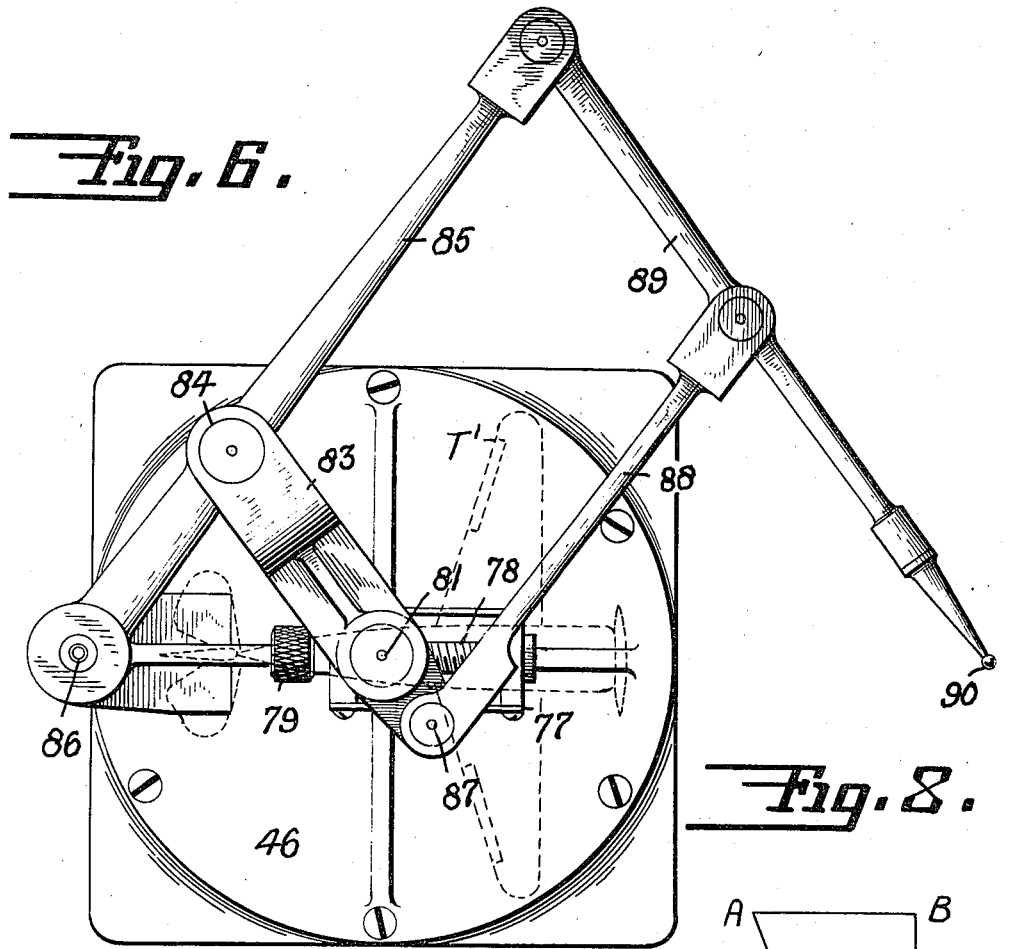
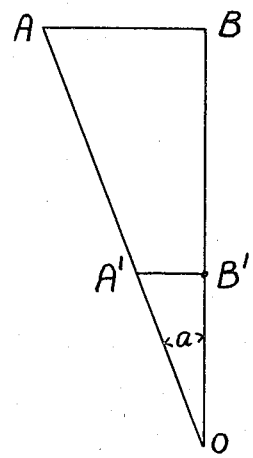
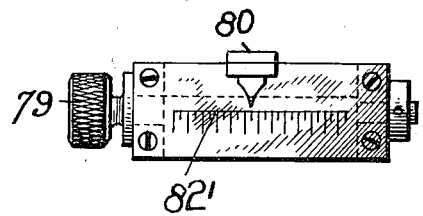
INVENTOR
FRANK R. HOUSE
BY
Herbert H. Thompson
HIS ATTORNEY.

Dec. 6, 1938.  F. R. HOUSE  2,139,635
UNIVERSAL ANTIAIRCRAFT SIGHT
Original Filed June 30, 1936  5 Sheets-Sheet 5

INVENTOR
FRANK R. HOUSE
BY
HIS ATTORNEY.

Patented Dec. 6, 1938

2,139,635

UNITED STATES PATENT OFFICE 2,139,635

UNIVERSAL ANTIAIRCRAFT SIGHT

Frank R. House, Baldwin Harbor, N. Y., assignor to Sperry Gyroscope Company, Inc., Brooklyn, N. Y., a corporation of New York Application June 30, 1936, Serial No. 88,082
Renewed July 7, 1938

15 Claims. (Cl. 33—46)

This invention relates to nocturnal anti-aircraft fire control devices, especially to the type in which sound locators are employed to locate the craft at night with or without the use of searchlights. My invention also has more general application to fire control against any rapidly moving target, even for daylight use.

It is well known that the direction of an aircraft, as indicated by the sound locator, is quite different from the true line of sight due to the high speed of modern aircraft and the comparatively slow speed of sound as compared to that of light. The angle between the line of sight and the sound locator angle is known as the sound lag error, and many devices have been proposed for computing this angle, most of which involve angular rate devices for computing the angular rate of movement of the sound locator in order to predict the position of the line of sight.

According to my present invention, I avoid the use of such rate computing devices and set up directly the true line of sight by means which is also independent of the height or range of the target. The principle on which my invention operates, while a known principle of physics, has never before been applied, as far as I am aware, to actually positioning the line of sight.

Referring to the drawings, showing one form my invention may assume,

Fig. 1 is a front elevation of a sound locator equipped with my sighting device.

Fig. 2 is a perspective view of the same, showing how it is operated.

Fig. 3 is a vertical section through the top portion of the mechanism, with parts in elevation.

Fig. 6 is a plan view of the linkage supporting the sighting ball.

Fig. 7 is a detail.

Fig. 8 is an elementary diagram showing the main principle involved in the invention.

Fig. 10 is a perspective view of a sighting device, showing how my invention may be applied thereto to give the future bearings and elevation angle for anti-aircraft daylight fire control.

Figure 4:
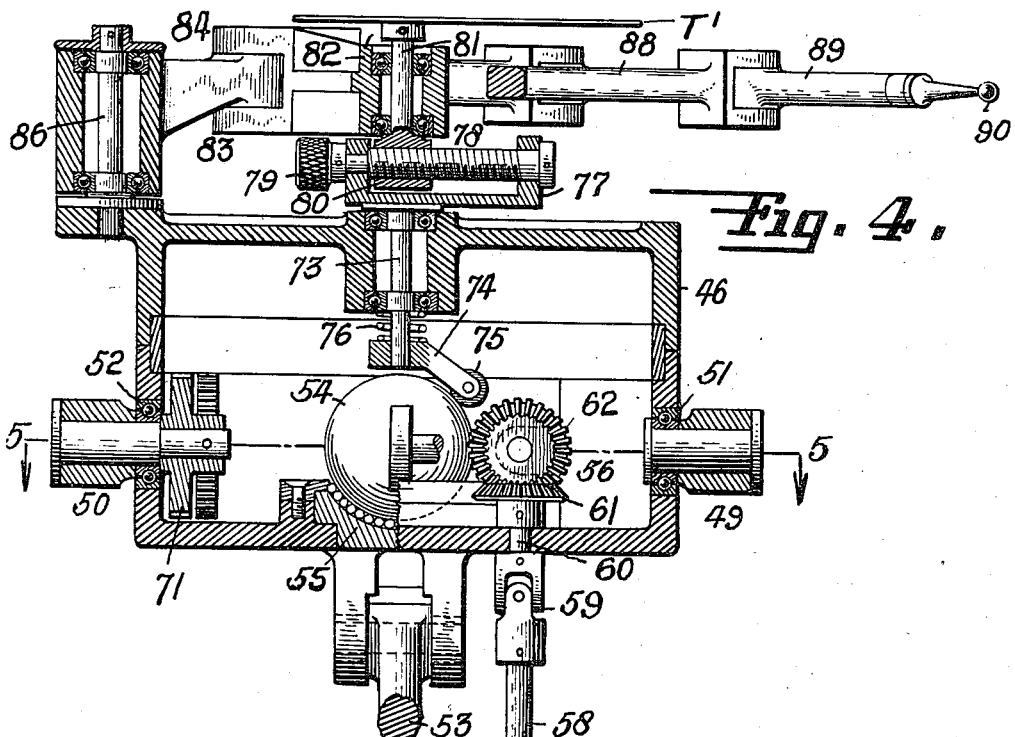
Fig. 4 is a vertical section through the pivotally mounted box on which the sighting knob is mounted, the section being taken approximately on line 4—4 of Fig. 5.

Referring first to Fig. 8, let an airplane be flying from A to B with the observer at the sound locator at O. If A be the position of the airplane at the moment the sound which is heard at O leaves the plane, and B be the position of the plane when the sound reaches O, then $$AO = VT$$

where V equals the velocity of sound and T the time taken for the sound to travel from A to O. Also, $$AB = UT$$

where U equals the velocity of the airplane. Therefore $$\frac{AB}{AO} = \frac{U}{V} = \frac{A'B'}{A'O}$$

of which V, the velocity of sound, is known and U, the velocity of the airplane, may be assumed or estimated. It is therefore proposed to set up at the sound locator a sighting arrangement wherein a similar triangle OA'B' is set up with ratio $$\frac{A'B'}{A'O}$$

Either A'B' or A'O may be varied to this end, but I prefer to vary A'B' in accordance with the aircraft's speed, wherein A'O represents the speed of sound (a constant). The subtended angle $a$ is the sound lag error angle.

While the above is true in three-dimensional space, it is difficult to set up in a machine, partially owing to the fact that the angular line of sight is received as resolved into azimuth and elevation components. I also prefer to displace the point B', which is preferably in the form of a small ball, for sound lag correction in the horizontal plane only, stabilizing its movements in a horizontal plane.

I prefer to incorporate my new sight directly on a sound locator, as shown in Figs. 1 and 2. In these figures, the conventional receiving horns of the sound locator are shown at 1, 2 and 3, said horns being mounted for turning in azimuth with a box 4 which is rotatably mounted on top of a standard 5 by bearings 6 and 7 (see Fig. 3). The horns are shown as supported for rotation in elevation by means of a horizontal hollow shaft 8 rotatably mounted transversely of the top of the box 4. It will be understood that the sound locator is rotated in any suitable manner in azimuth and elevation, the azimuth movement being effected from a handwheel 9 through bevel gears 10 and pinion 11 mounted in box 4, said pinion meshing with a large gear 12. For elevation, the operator turns a handwheel 13 which rotates a bevel pinion 14 to turn an annular bevel gear 15 secured to the hollow shaft 8 to rotate the horns in elevation. The operator of handwheel 9 wears helmet ear phones P and P' connected to horns 1 and 2, and the operator of handwheel 13 wears helmet ear phones E and E' connected to horns 2 and 3, as disclosed in my prior application for Sound locator receivers, Serial No. 66,158, filed February 28, 1936.

On top of the box 5 I show a small sight 16 which normally turns with the box, but is mounted for independent rotation both in azimuth and elevation, being trunnioned in the same manner as the searchlight or other device used for disclosing or observing the position of the aircraft. As shown, the sight comprises an eye piece 17, reflecting prism 18 and cross hairs 19, the same being mounted on horizontal trunnions in a bracket 20 mounted on a gear 21 journaled on top of the box. The sight, being mounted on the box, turns with it in azimuth but may be given an additional motion for the sound lag error correction angle in the azimuth plane by turning a small handwheel 9', which turns through bevel gears 22 a shaft 24, the latter carrying at its top a gear 25 meshing with the gear 21. The sight is turned in elevation with the sound locators by means of bevel gears 26, 26' which turns gear 27 through a differential 28. The middle arm of said differential is shown as turned from the elevation correction handwheel 13' so that the gear 27 is given the corrected elevation movements. The motion of said gear is transmitted through gear 29, differential 30 and gear 31 to a gear 32, on the shaft 33 on which is a bevel gear 34 which meshes with an annular bevel gear 35 to rotate the sight in elevation. Differential 30 is for the purpose of preventing changes in azimuth from affecting the elevation angle, the shaft 24 having a gear 36 thereon meshing with the central arm of said differential. 37 and 38, respectively, are the elevation and azimuth transmitters for transmitting the corrected sound or true sight angles to the guns or searchlights. Elevation transmitter 37 is shown as having the shaft 39 thereof driven from a gear 40, meshing with gear 27, while the azimuth transmitter is turned from a differential 41 which adds the azimuth movements of the box 4, created by the rotation of the pinion 42 meshing with a fixed gear 43, to the sound lag error corrected azimuth angle given by shaft 24, which is shown as having a pinion 44 thereon meshing with the central arm of the differential.

The problem, then, is to direct the sight to the true position of the airplane in space without the airplane being seen and entirely from the position of the sound locator. I have endeavored to illustrate my solution of the problem in the three-dimensional diagram of Fig. 9, supplemented by the plan view of Fig. 9A. The sound locator and sight are represented as located at O, the airplane T flying along the line TAB, which is assumed to be horizontal, in the direction of the arrow. At a selected instant, the sound locator locates the aircraft apparently at A. Assuming the speed of the craft to be known, the aircraft will in a unit of time be in some position on the circumference of the circle D subscribed with point A as a center and a radius proportional to the speed of the craft. However, the sound locator by continuous observation has determined that the aircraft is headed in the direction TAB and therefore the airplane must lie at point B at the end of the time interval assumed. The azimuth angle as given by the sound locator will then be $b$ and the elevation $c$. By the time the sound reaches the sound locator, however, the airplane has traveled to the unknown point B and the problem is to position the false target in the line of sight between O and B, say at B'. A study of the diagram will show that the bearing angle at point B is angle $b'$ and the elevation angle is $c'$, the azimuth and elevation angular corrections being consequently the angles $\Theta$ and $\emptyset$, respectively, where the line OC is drawn from point of origin O to intersect the Y diameter of the circle D subscribed about A as a center and with a radius AB by dropping the perpendicular from B to the Y diameter $$(i.\ e.,\ \angle c'' = \angle c')$$

(see diagram 9A). It should be observed that although D is a true circle, it appears in Fig. 9 as an ellipse, since it is viewed from a point in front of and to one side of the Y axis. Similarly, in such case, the locus of the false target at B' is a true circle, but means are provided so that it is likewise viewed edgewise so that it would appear as an ellipse geometrically similar to the ellipse formed by circle D. To obtain this result, the path of movement of the false target is kept truly horizontal to correspond to the assumed plane of movement of the airplane, and means are provided to position the point B' on the minute circle D' on the line OB. Assuming a fixed length of the perpendicular A'E, the length of the radius A'B' can be set into the machine. (See the above equations and Fig. 8.) Hence, the line of sight OB'B can be located, which will give at once the true azimuth and elevation angles $b'$ and $c'$ or, in other words, the corrections for each, $\Theta$ and $\emptyset$.

I show pivotally mounted adjacent the box 4, a second box 46 which is mounted for bodily rotation in azimuth with the box 4. In elevation, the box is rotated bodily around the axis of the hollow shaft 8, but is preferably prevented from rotating on its own axis, so that the top of the box remains horizontal. To this end, the box is shown as pivotally mounted on an arm 47 which is secured to rotate with the shaft 8, as by riveted flange 48. Said arm is shown as forked at its outer end and has therein inwardly extending trunnions 49 and 50 (Fig. 4) journaled in bearings 51 and 52 in the sides of the box. To keep the box horizontal, the outside corner is shown as connected by link 53 to the box 4 so as to constitute with the arm 47 a parallel linkage.

When the sound locator follows the target, the angular displacement in azimuth and elevation is $$\angle b\ \text{and}\ \angle c,$$

respectively, (see Fig. 8). I actually bring in these resolved angular movements of the sound locator within the box 46 and apply the same to the rotation of a small sphere 54 which is mounted for universal movement in a cup 55 which, if desired, may be provided with ball bearings to provide sufficient freedom of movement. The azimuthal movements are transmitted to the ball from a gear 56 which rotates, through universal joint 57, an extensible shaft 58, the latter rotating through a universal joint 59 the shaft 60, journaled in the bottom of the box 46. Said shaft is shown as having a bevel gear 61 thereon, meshing with a second bevel gear 62, the shaft of which is journaled in a bracket 63. Said shaft carries a friction disc 64 engaging the surface of the sphere to rotate the same with the top moving upwardly or downwardly in Fig. 5.

Figure 5:
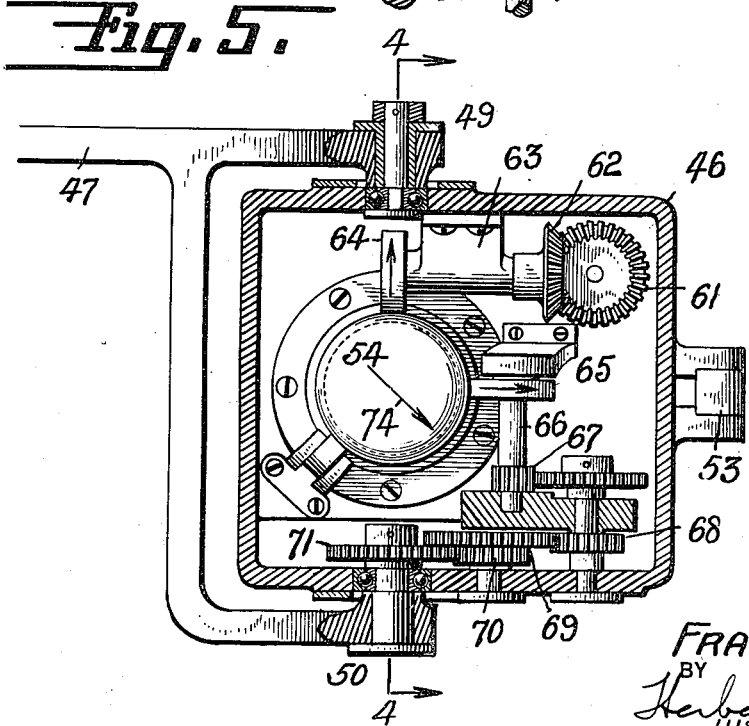
Fig. 5 is a transverse section taken approximately on line 5—5 of Fig. 4.

The movement in elevation is introduced through a second friction roller 65, placed at right angles to roller 64 so as to rotate the sphere with the top moving right or left in Fig. 5. As shown, the roller 65 is mounted on a shaft 66 driven from a pinion 67 actuated through a reduction gear train 68 and 69. The pinion 70 of the latter meshes with a gear 71 fixed to the trunnion 50. It will readily be seen, therefore, that as the box is lifted in elevation, the pinion 70 will be revolved because of the fact that the box 46 is held horizontal.

Figure 9A:
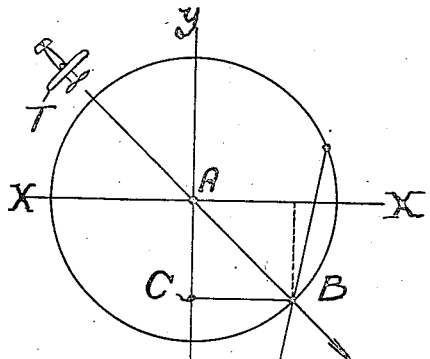
Fig. 9A is a plan view taken in the same horizontal plane as the aircraft.
Figure 9:
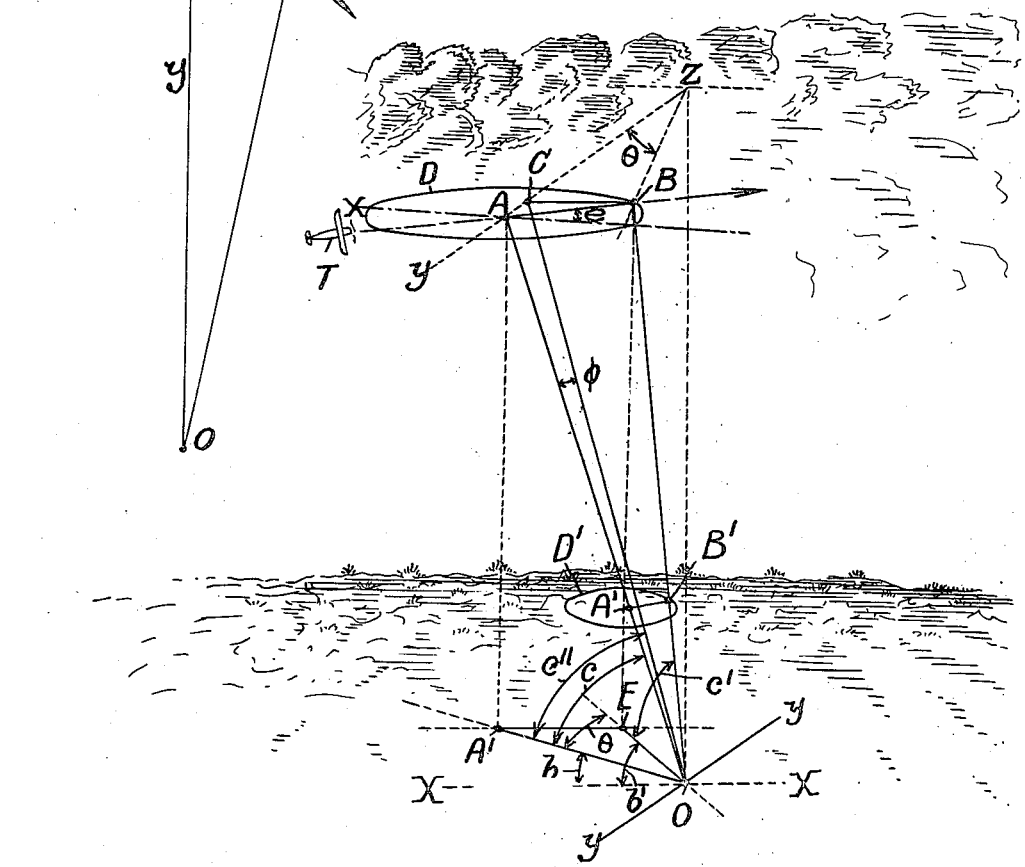
Fig. 9 is a diagram in three dimensions showing the operation of my invention in greater detail.

If, now, it be assumed that the rollers 64 and 65 are rotated at equal speeds in the direction of the arrows in Fig. 5, the top of the ball will move in the direction of the arrow 72 in this figure, while if the roller 65, for instance, stops, the arrow 72 will lie in the same line with the arrow on roller 64. In other words, the rotation of the ball lies in a plane between the vertical planes of the rotation of the rollers 64 and 65, at an angle proportional to the relative speeds of rotation of the rollers. It may be shown mathematically that the gear ratios between the azimuth drive to roller 64 and between the elevation drive to roller 65 should not be the same and, in fact, for theoretically perfect results, at least one drive should be varied with a function of the angular elevation ($\cos \emptyset$, $\sin \emptyset$), as more completely described and claimed in my later filed application, Serial No. 144,018, filed May 21, 1937. For practical purposes, however, due to various factors such as sound refraction at low elevation angles and difficulty of operation at high elevation angles, the useful operating range of the sound locator is in the region of about 15 to 75 degrees elevation. For simplicity in design, therefore, in the preferred embodiment of my invention I take a mean value of $\cos \emptyset \sin \emptyset$ as .4 and make the gear ratios such that the speed of roller 65 is ¼ or 2.5 times faster than the speed of rollers 64 for the same angular velocities of the sound locator in azimuth and elevation. By this means I recombine the component angular movements in azimuth and elevation of the sound locator, angles $b$ and $c$, to give the true direction of movement of the target, i. e., to give angle $e$ (Fig. 9A). Then when the radius A'B' is set at this angle and proportional to target speed in this horizontally stabilized path of movement, line of sight OB'B will be fixed.

In order to utilize the plane of rotation of the sphere for this purpose, I have shown mounted above the sphere on a vertical shaft 73 an arm 74 carrying a roller 75 which is normally pressed downwardly on the sphere by a spring 76. The bearings supporting the shaft 73 permit the roller to turn in any direction and it will be obvious that the direction that the arm or castor 74 assumes will lie in the plane of rotation of the sphere, giving angle $e$, since the axes of shaft 73, roller 64 and roller 65 are each perpendicular to the other.

It then becomes necessary to combine the determined path or direction of flight of the target with the target speed, which is set in an offset to get the correct sight angle. To this end, I mount on top of the shaft 73 an eccentric bracket 77 in which is rotatably mounted threaded shaft 78, which may be turned by the thumb piece 79. Threaded on said shaft is a traveling nut 80 which carries a vertical pin 81 journaled in a hub 82 of a link 83. Said link is shown as pivotally at one end 84 to a long link 85 which is pivotally mounted at 86 on top of the housing 46. At its opposite end 87, said link 83 is shown as pivoted to a parallel link 88. Links 85 and 88, in turn, are pivoted to an outer link 89 which carries at its outer end a small button or ball 90 which serves as the sighting object for the sight 17 and, in other words, as a false target. The ball 90 will obviously reproduce the movements of the shaft 81, the object of the linkage being to position the ball away from the box 46 so as to be readily visible from the sight in as many positions as possible, and provide for vision into space beyond the ball. This serves to check the alignment of the searchlight with directional sound data and enables observation of the airplane with reference to the corrected position in daylight practice. When the two shafts 73 and 81 are in line, as shown in Fig. 4, the position of the ball remains unchanged regardless of the rotation of the sphere 54. When, however, the shaft 81 is displaced with respect to the shaft 73, the false target 90 will assume different positions for different planes of rotation of the sphere and if the plane of rotation of the sphere is turned through 360°, the ball will describe a circle of a radius equal to the distance between the centers of the shafts 73 and 81. From the discussion of the similar triangles given above, it will be apparent that if the shaft 81 be displaced from the shaft 73 a distance proportional to the velocity of the aircraft, the true line of sight may be located on the circle which would be described by the ball or false target if the plane of the rotation of the sphere turned through a complete circle, the center of which lies in the indicated sound line from the target, and the plane of the line of sight is definitely located by the castor 74, which turns the bracket 77 so that the displacement of shaft 81 lies in the proper direction to direct the line of sight at the target. While the actual path of movement of the ball is a circle if the plane of rotation of the sphere be turned through 360°, the path of movement as seen from the side would only be a true circle in case the airplane were directly overhead. In all other positions the path of movement will appear as an ellipse (see Fig. 9).

It is hence apparent that the only arbitrary setting of my device required to obtain the sound lag error is the estimation of the air speed of the craft, according to which the screw 78 is set. A special scale 82' may be provided for this purpose, as shown in Fig. 7. Due to the fact that the air speed and not ground speed is inserted into the instrument, errors in sound direction due to wind drift are practically nullified. Since the direction of shaft 78 indicates the path of flight of the aircraft, a miniature airplane T' may be secured to the top of shaft 81, if desired, (Fig. 6), so that the heading of the target may be graphically shown the observer, because not only does shaft 78 lie parallel to the path of the craft, but airplane T' will also face in the proper direction, lying with its propeller in the design shown directly over arm 74 and roller 75.

It should be further apparent from the foregoing description that my invention is also applicable to daylight firing, in which case no sound locator is employed. If the sight were designed for this purpose, the ratio between the distances OA' and A'B', that is, the ratio of the vertical distance of the false target 90 above the center of the sight 16 to the offset distance of point 81 from the center of shaft 73 is set, not in accordance with the ratio between the speed of sound and the speed of the aircraft, but in accordance with the estimated average velocity of the shell and the speed of the aircraft. Such a device is shown in Fig. 10, in which the constructional features shown in Figs. 3 to 7, inclusive, may be retained, but the sound locator shown in Figs. 1 and 2 is replaced by a second sight S which is kept at all times on the target and which positions the auxiliary sight 16 and the box 46 in azimuth and elevation in the same manner as does the sound locator in Figs. 1 and 2. Likewise, the false target 90 is offset by similar mechanism an amount in azimuth and elevation equal to the future bearing and superelevation angles, respectively.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a sound locator for aircraft targets, the combination with sound responsive receivers mounted for turning in azimuth and elevation, a sight mounted thereon for turning movements in like planes, a spaced false target, and means for maintaining the said false target in the true line of sight from said sight to the aircraft including means for displacing the said false target from the indicated sound position line proportionally to the estimated speed of the aircraft, and means for determining the direction of such displacement from the azimuth and elevation movements of said receivers.

2. In a sound locator for aircraft targets, the combination with sound responsive receivers mounted for turning in azimuth and elevation, a sight mounted thereon for turning movements in like planes, a spaced false target, and means for maintaining the said false target in the true line of sight from said sight to the aircraft including means for displacing the said false target in a plane from the indicated sound position line proportionally to the estimated speed of the aircraft, means for stabilizing the plane of displacement of said false target horizontally, and means for determining the direction of such displacement from the azimuth and elevation movements of said receivers.

3. As a means for assisting in the positioning of a false target in a sighting device for use with anti-aircraft sound locators, a sphere mounted for rotation in all planes, a drive roller for rotating it in one plane, driven from the turning of the sound locator in azimuth, a second drive roller for rotating the sphere in a plane perpendicular to said first plane and driven from the turning of the sound locator in elevation, and means positioned by said sphere for determining the resultant plane of rotation, said false target being positioned in part by said means.

4. As a means for assisting in the positioning of a false target in a sighting device for use with anti-aircraft sound locators, a sphere mounted for rotation in all planes, a drive-roller for rotating it in one plane, driven from the turning of the sound locator in azimuth, a second drive roller for rotating the sphere in a plane perpendicular to said first plane and driven from the turning of the sound locator in elevation, means positioned by said sphere for determining the resultant plane of rotation, a false target rotatable about the indicated sound line of the real target, means for setting the radius thereof in accordance with the air speed of the real target, and means for setting the plane of said radius from said means positioned by said sphere.

5. In a sound locator for aircraft targets, the combination with sound responsive receivers mounted for turning as a unit in azimuth and elevation, a sight mounted thereon for turning movements in like planes, a spaced false target mounted on said locator for revolution in azimuth therewith, means for revolving said false target in elevation with said receivers, said false target being adjustable in a plane, means for maintaining said plane of adjustment horizontal, and means responsive to the angular displacements of said receivers for displacing said false target from a position in line with the indicated sound position of the craft to a position in the true line of sight.

6. The combination with a sound locator for aircraft, of a sight and false target therefor for fixing the true line of sight from the indicated sound line, a computing device on which said false target is mounted, means for mounting said device for revolution in azimuth and elevation with the sound locator, means on said device for displacing said false target from the indicated sound line an amount proportional to the speed of the craft, and means operated by the movements of the sound locator in azimuth and elevation for determining the direction of said displacement.

7. In a device for directing fire at aircraft, a primary device for continuously determining by direct observation the angular position of the target in azimuth and elevation, a sight and false target for determining a correction in such angles and mounted for revolution in azimuth and elevation, the sight being used to maintain a line of sight on the false target, means for revolving said false target at least with said device, means for displacing said false target an amount which is a function of the target's speed, and means for determining the direction of said displacement from the angular movements of said device.

8. In a sound locator for aircraft targets, the combination with sound responsive receivers mounted for turning as a unit in azimuth and elevation, a sight mounted thereon for turning movements in like planes, a spaced false target, and means for maintaining the same in the true line of sight from said sight to the aircraft including means for displacing the same from the indicated sound position line proportionally to the ratio between the speed of sound and the estimated speed of the aircraft, means for determining the direction of such displacement responsive to the azimuth and elevation movements of said receivers, and means for confining such displacement to a horizontal plane.

9. In a device for directing fire at aircraft, a primary sighting device for continuously determining by direct observation the angular position of the target in azimuth and elevation, a secondary sight and false target for determining a correction in such angles and mounted for revolution in azimuth and elevation, means for revolving said false target at least with said device, means for displacing said false target an amount proportional to the ratio between the target's speed and the velocity of the shell, means for determining the direction of said displacement responsive to the angular movements of said device, and means for maintaining the plane of such displacement horizontal.

10. An anti-aircraft gun direction as claimed in claim 9, having means for transmitting the angular elevation and bearing of said secondary sight to the guns.

11. In a device for directing fire at aircraft, a primary device for continuously determining by direct observation the angular position of the target in azimuth and elevation, a sight and false target for determining a correction in such angles and mounted for revolution in azimuth and elevation, the sight being used to maintain a line of sight on the false target, means for revolving said false target at least with said device, means for displacing said false target an amount which is a function of the target's speed, means for determining the direction of said displacement from the angular movements of said device, and means for transmitting the angular elevation and bearing of said sight to the guns.

12. As a means for assisting in the positioning of a false target in a sighting device for use with anti-aircraft fire control, a primary device for continuously determining by direct observation the angular position of the target in azimuth and elevation, a sphere mounted for rotation in all planes, a drive roller for rotating it in one plane, driven from the turning of the device in azimuth, a second drive roller for rotating the sphere in a plane perpendicular to said first plane and driven from the turning of the device in elevation, and means positioned by said sphere for determining the resultant plane of rotation, said false target being positioned in part by said means.

13. As a means for assisting in the positioning of a false target in a sighting device for use with anti-aircraft guns, a primary device for continuously determining by direct observation the angular position of the target in azimuth and elevation, a sphere mounted for rotation in all planes, a drive roller for rotating it in one plane, driven from the turning of the device in azimuth, a second drive roller for rotating the sphere in a plane perpendicular to said first plane and driven from the turning of the device in elevation, means positioned by said sphere for determining the resultant plane of rotation, a false target rotatable about the indicated line of sight to the real target, means for setting the radius thereof in accordance with the air speed of the real target, and means for setting the plane of said radius from said first named means.

14. In an anti-aircraft fire control mechanism, a primary device for continuously determining by direct observation the angular position of the target in azimuth and elevation, a sphere, means for rotating the sphere about one axis from the azimuthal angular movements of said device, means for rotating said sphere about another axis perpendicular to the first axis from the elevation movements of said device, a follower positioned about an axis perpendicular to both of said other axes of rotation in accordance with the relative speed of rotation of said sphere about said first two axes, and means positioned by said follower, indicating the direction and path of flight of the aircraft.

15. System for determining the direction from a point on the ground to the later of two positions of an aircraft, comprising a primary device for continuously determining, by direct observation, the earlier of the two positions of the aircraft, and means for constructing a vector triangle in space, one side of which triangle is materialized as a member of constant length directed along the indicated direction of observation, while a second side, materialized as a member adjustable in azimuth with respect to the first side and also adjustable in length, is directed along the direction of travel of the aircraft, and is proportional to a function of the speed of the aircraft, comprising also a sight, and means for directing the line of sight therefrom along the third side of the triangle.

FRANK R. HOUSE.